US010065132B2

(12) United States Patent
Kocherginksy

(10) Patent No.: US 10,065,132 B2
(45) Date of Patent: Sep. 4, 2018

(54) MEMBRANE-BASED WASHING AND DEACIDIFICATION OF OILS

(71) Applicant: Nikolai Kocherginksy, Urbana, IL (US)

(72) Inventor: Nikolai Kocherginksy, Urbana, IL (US)

( * ) Notice: Subject to any disclaimer, the term of this patent is extended or adjusted under 35 U.S.C. 154(b) by 211 days.

(21) Appl. No.: 15/093,666

(22) Filed: Apr. 7, 2016

(65) Prior Publication Data
US 2017/0291121 A1    Oct. 12, 2017

(51) Int. Cl.
| | |
|---|---|
| B01D 61/02 | (2006.01) |
| B01D 11/04 | (2006.01) |
| B01D 61/24 | (2006.01) |
| B01D 63/02 | (2006.01) |
| C10G 21/00 | (2006.01) |

(Continued)

(52) U.S. Cl.
CPC ...... *B01D 11/0415* (2013.01); *B01D 11/0492* (2013.01); *B01D 61/246* (2013.01); *B01D 63/02* (2013.01); *C10G 21/00* (2013.01); *C10G 33/06* (2013.01); *C10L 1/026* (2013.01); *C11B 3/008* (2013.01); *C11B 13/00* (2013.01); *C11C 1/002* (2013.01); *C11C 1/08* (2013.01); *B01D 2011/005* (2013.01); *B01D 2311/10* (2013.01); *B01D 2311/14* (2013.01); *B01D 2311/25* (2013.01); *C10L 2290/544* (2013.01); *C10L 2290/548* (2013.01)

(58) Field of Classification Search
CPC ... B01D 2325/38; B01D 17/02; B01D 61/246
See application file for complete search history.

(56) References Cited

U.S. PATENT DOCUMENTS 3,413,324 A * 11/1968 Seip .................. C11B 3/06
554/202
4,062,882 A  12/1977 Sen Gupta
(Continued)

FOREIGN PATENT DOCUMENTS

| EP | 1201737 B1 | 10/2005 |
|---|---|---|
| WO | 2008002154 A2 | 1/2008 |
| WO | WO 2017/180167 A1 * | 10/2017 |

OTHER PUBLICATIONS

Atadashi I.M., "Purification of crude biodiesel using dry washing and membrane technologies." Alexandria Engineering Journal (2015) 54, 1265-1272.

(Continued)

*Primary Examiner* — Ana M Fortuna
(74) *Attorney, Agent, or Firm* — Intellent Patents LLC; Ahmed Alhafidh

(57) ABSTRACT

Membrane-based method of washing and deacidification of oils, wherein a stream of oil is conveyed from an oil reservoir along one side of porous hydrophobic membrane, and washing aqueous solution is conveyed along another side of this membrane. The membranes form hollow fibers, and their total surface area and porosity are large enough for efficient removal of fatty acids, water, ions and hydrophilic organic impurities from oil. Membrane pore size is small enough, so that hydrodynamic mixing of oil and aqueous solution does not take place. Additional stabilization of oil/water meniscus in the pores is achieved by transmembrane pressure difference.

11 Claims, 6 Drawing Sheets

Kinetics of pH change in acidified aqueous solution due to transfer of fatty acids from octane through a flat membrane. 1- oleic acid; 2- decanoic acid; 3-pelargonic acid; 4-octanoic acid; 5-ethylhexanoic acid.

(51) Int. Cl.
*C11B 3/00* (2006.01)
*C10G 33/06* (2006.01)
*C10L 1/02* (2006.01)
*C11B 13/00* (2006.01)
*C11C 1/00* (2006.01)
*C11C 1/08* (2006.01)
*B01D 63/00* (2006.01)
*B01D 11/00* (2006.01)

(56) References Cited

U.S. PATENT DOCUMENTS

| | | | |
|---|---|---|---|
| 4,101,563 A | 7/1978 | Landis | |
| 4,533,501 A * | 8/1985 | Sen Gupta | C11B 3/008 554/176 |
| 4,617,126 A * | 10/1986 | Funk | B01D 61/02 210/500.41 |
| 5,263,409 A | 11/1993 | Van et al. | |
| 5,310,487 A | 5/1994 | Lamonica | |
| 5,545,329 A | 8/1996 | Lamonica | |
| 5,746,908 A | 5/1998 | Mitchell | |
| 6,117,327 A | 9/2000 | Ciora et al. | |
| 6,146,535 A * | 11/2000 | Sutherland | B01D 17/08 210/500.23 |
| 6,228,239 B1 | 5/2001 | Manalastas et al. | |
| 6,471,869 B1 * | 10/2002 | Yanou | B01D 61/14 210/195.2 |
| 6,511,690 B1 | 1/2003 | Tysinger et al. | |
| 6,517,725 B2 * | 2/2003 | Spearman | B01D 17/04 210/640 |
| 7,494,676 B2 | 2/2009 | Chakrabarti et al. | |
| 7,935,157 B2 | 5/2011 | Kozyuk et al. | |
| 8,486,267 B2 * | 7/2013 | Seibert | B01D 67/0093 210/634 |
| 2002/0100726 A1 * | 8/2002 | Spearman | B01D 17/04 210/640 |
| 2002/0139711 A1 | 10/2002 | Varadaraj | |
| 2002/0198323 A1 | 12/2002 | Morris | |
| 2003/0209493 A1 * | 11/2003 | Koseoglu | A23J 7/00 210/651 |
| 2004/0079706 A1 * | 4/2004 | Mairal | B01D 17/02 210/651 |
| 2005/0118313 A1 | 6/2005 | Jirjis et al. | |
| 2006/0247454 A1 | 11/2006 | Tysinger et al. | |
| 2014/0021099 A1 * | 1/2014 | Sirkar | F01M 1/10 208/179 |
| 2014/0131279 A1 * | 5/2014 | Seibert | B01D 63/02 210/636 |
| 2017/0291121 A1 * | 10/2017 | Kocherginksy | B01D 11/0415 |

OTHER PUBLICATIONS

Atadashi I.M., Aroua M.K., Abdul Aziz A.R., Sulaiman N.M.N., "The effects of water on biodiesel production and refining technologies: A review." Renewable and Sustainable Energy Reviews 16 (2012) 3456-3470.

Kocherginsky N.M., Yang Q., Seelam L., "Recent advances in supported liquid membrane technology." Separation and Purification Technology 53 (2007) 171-177.

* cited by examiner

Kinetics of pH change in acidified aqueous solution due to transfer of fatty acids from octane through a flat membrane. 1- oleic acid; 2- decanoic acid; 3-pelargonic acid; 4-octanoic acid; 5-ethylhexanoic acid.

Kinetics of fatty acid transport from more viscous mineral oil and less viscous octane into an aqueous buffer with initial pH 4. 1- pelargonic (nonanoic) acid from mineral oil; 2- ethylhexanoic acid from mineral oil; 3- ethylhexanoic acid from octane.

Gas chromatography of initial fatty acid mixture in octane. 1-octane, 2-octanoic acid, 3- pelargonic acid, 4-capric (n-decanoic) acid).

Gas chromatography of the same mixture after membrane-based washing.

Kinetics of pH change in alkaline aqueous solution due to transfer of mixture of octanoic, pelargonic, and n-decanoic acids from octane through the hollow fiber membrane module.

MEMBRANE-BASED WASHING AND DEACIDIFICATION OF OILS

FIELD OF TECHNOLOGY

This disclosure relates generally to a process for refining of different oils, and in particular to a membrane-based process for free organic acids removal.

BACKGROUND

The great majority of oil production, especially vegetable oil production, includes oil extraction and then oil refining. Hexane is a solvent commonly used to dissolve the oil and form less viscous solution called miscella. The crude oil or miscella must then be subjected to additional treatments, called refining, to remove various materials. These materials include free fatty acids, phospholipids, color and flavor components, etc. Biodiesel after synthesis includes methanol, catalyst, water, soaps, and glycerol, which should be also removed. Presence of impurities should not be above ACT and other standards.

A wide variety of oils, primarily for food, and biofuel uses, in addition to crude, include organic acids, such as free fatty and naphthenic acids. These components must be removed, in the case of food oils to minimize rancid taste and in the case of biofuels and crude oils to reduce acid corrosion of metal parts. One of the important parameters to characterize oil quality is total acid number (TAN), and its decrease leads to an increase of market price of the oil. It is defined as the number of milligrams of potassium hydroxide required to neutralize the acids in a sample (mg KOH/mg sample). TAN is important also for crude petroleum oils. In this case the potassium, sodium and calcium hydroxides or monoethanolamine are used to neutralize the oil, but naphthenic acids, which are the main component leading to the high TAN, remain in the crude together with metal ions, and their separation and removal is complicated. Related to TAN characteristic is an acid value, which is based on pH in aqueous solution preequilibrated with oil.

The free fatty acids are removed from the oil by the process known as chemical or alkali refining. In this process, the oil is usually mixed with alkaline aqueous solutions of sodium or potassium hydroxides, washed, and then separated from alkaline solution. Nonhydratable calcium and magnesium salts of phospholipids are also removed along with fatty acids. An aqueous phase formed after separation from the neutralized oil is called a soapstock. Hydratable phospholipids are usually removed by a process called degumming, which includes treatment with aqueous or acidic solutions.

Chemical oil refining is an expensive process, requiring a large investment in equipment, but it also leads to partial saponification reaction of oils. A significant quantity of the oil is captured by the soaps and stable water-in-oil emulsions formed in the process. Conventional oil refining also involves bleaching with clays, silica or other adsorbents and deodorization at high temperature and vacuum. This treatment of edible oils leads to loss of valuable components including antioxidants.

Currently preferred method of accomplishing deacidification is to create an emulsion of the oil and an aqueous solution of an alkali such as sodium hydroxide (NaOH). These liquids are mixed for a prolonged period before separating the two non-miscible fluids, commonly by means of mixer-settler and/or centrifugation. Neutralization has to be fast, and to reach this it is necessary to have large surface area of water emulsion in oil. This leads to small size of the aqueous droplets, which are additionally stabilized by surface active fatty acids and are difficult to remove.

The treated oil can be subjected to electrofiltration by passing through a solid particles bed with an imposed dc electric field having a gradient of at least 20 kV/inch. Other methods like electric desalting and distillation have also been used. All these methods are each technically, temporally or monetarily inefficient.

Refining of oils can be conducted using pressure-driven membrane processes. Examples of relevant prior art are:

U.S. Pat. Nos. 4,062,882 and 4,533,501 describe membrane filtration under pressure to separate phospholipids from oils dissolved in nonpolar solvents, including hydrocarbons. Phosphatides form micelles in these solvents, and are retained while oils are passing through the membrane. Separation selectivity is based on different size of micelles and oil molecules.

U.S. Pat. No. 5,545,329 describes a module with many flat parallel polyimide membranes and pressure-driven separation.

U.S. Patent application US 2005/0118313 describes a microfiltration membrane-based method to separate lecithin from the miscella. The pore size in a polymer membrane was in the range from 0.1 to 2 micron.

International patent WO 2008/002154 A2 describes a process for reducing the free fatty acid content of natural oils by direct contacting the crude natural oil with an immiscible solvent to produce depleted in free fatty acids oil and a free fatty acid rich solvent phase. This last phase was further processed with pressure-driven membrane treatment to separate the free fatty acids from impurities of glycerides. The method still needs physical mixing and then pressure-driven separation, it needs large volumes of this solvent and does not allow an easy separation of fatty acids from it.

Ind. Eng. Chem. Res. 1992, 31, 581 describes extraction of fatty acids from oil using ultrafiltration hydrophilic cellulose-based hollow fiber membrane module. Fatty acids were extracted from oil to 1,2-butanediol, and then they were removed by addition of water and demixing of the acceptor phase. Because of low interfacial tension to keep both donor and acceptor phases separated membrane pore size was 3.5 nm.

Another type of membrane-based process is based on hollow fiber membrane contactors, which have found many applications for debubbling and gas removal from water and organic solutions. See for example, U.S. Pat. No. 6,402,818 B1. Selective separation is possible here not because of different size of dissolved gas and solvent molecules, but because of their different volatility. Another example of prior art in this area is described in the U.S. Pat. No. 5,263,409, where a membrane contactor was used to facilitate a contact between bittering agents present in a citrus juice and a hydrophobic extraction fluid. Extraction of organic components from aqueous solution into organic phase in a hollow fiber membrane module was described in J. of Membrane Science 50, 153-175, 1990

SUMMARY

The purpose of this disclosure is to provide a continuous oil refining process, where the oil is not directly mixed physically with aqueous or other solutions, but still has a large surface area of contact with this second phase used for extraction. Fast extraction of hydrophilic impurities from oil into aqueous solution is possible because of high total area of pores per unit volume of membrane module and high mass transfer coefficient of these impurities diffusing through the pore filled with liquid oil.

Contact is possible through a highly porous membrane. The effective pore size is in the range 0.02-0.07 microns. These pores are much larger than molecular size of lipids and oils, but small enough so that direct hydrodynamic mixing of feed and acceptor solutions does not take place. Transmembrane pressure as a driving factor is not used in the process, and it is important only to keep formed by two immiscible liquids meniscus in the pores.

As the result, emulsification of water in oil and losses of oil in washing water decrease. Membrane-based washing is conducted without strong heating, so that thermo-labile and physiologically active components of oil stay native and active.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying detailed description that follows.

DETAILED DESCRIPTION

Examples

The process depends on several different physicochemical factors, and the examples below illustrate these dependences.

Example 1

Figure 1:
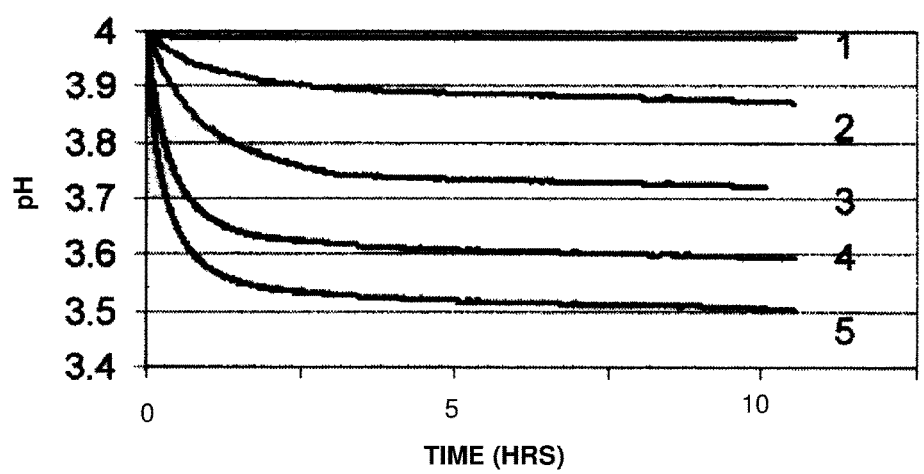
FIG. 1 illustrates kinetics of pH change due to transfer of dissolved in octane fatty acids with different alkyl chains through a flat membrane.

This example illustrates effect of fatty acid structure, and it shows membrane-based extraction of different fatty acids from octane through flat porous membrane with surface area 10 cm$^2$ into aqueous phase (FIG. 1). Both donor phases are stirred. Fatty acids with different alkyl chain length are washed out from octane into aqueous solution, which becomes more acidified. For the same molar acid concentration the initial rates are inversely proportional to octane/water distribution coefficients of the fatty acid, and they change by 15-20 times from ethylhexanoic to decanoic acid. Important for olive oil and other plant oils oleic acid ($C_{18}H_{34}O_2$) practically is not removed from octane, as indicated in FIG. 1. At pH 4 the method may be used to selectively remove shorter fatty acids and acid-soluble colored components.

Example 2

Figure 2:
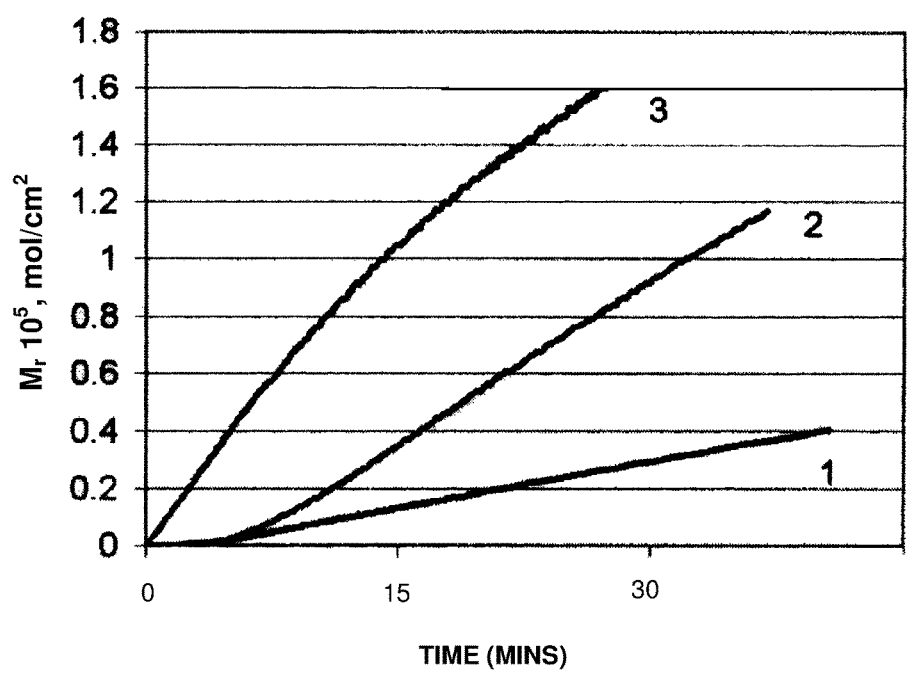
FIG. 2 illustrates fatty acid removal kinetics from more viscous mineral oil and less viscous octane.

This example illustrates initial fatty acid removal kinetics per unit area of the membrane from more viscous mineral oil and less viscous octane. FIG. 2 illustrates kinetics of 1M fatty acid transfer from different organic solvents into an aqueous buffer with initial pH 4.0. 1-pelargonic acid ($C_9H_{18}O_2$) from mineral oil; 2-ethylhexanoic acid from mineral oil; 3-ethylhexanoic acid from octane. Similar to the first example, shorter ethylhexanoic acid is removed from mineral oil faster than longer pelargonic acid. Removal of ethylhexanoic acid is much faster from less viscous octane.

Example 3

Rate of fatty acids removal (measured in moles per unit area per unit of time) is increased by increasing acceptor pH. Thus, initial rate of octanoic acid removal at pH 11 is 10 times faster than at pH 4. For oleic acid at pH 12 initial rate is 10,000 times faster than at pH 4. As the result, at pH 12 the selectivity is practically lost, and all acids are removed simultaneously and faster. If the purpose is to remove all acids, it is better to use higher pH.

Example 4

Figure 3:
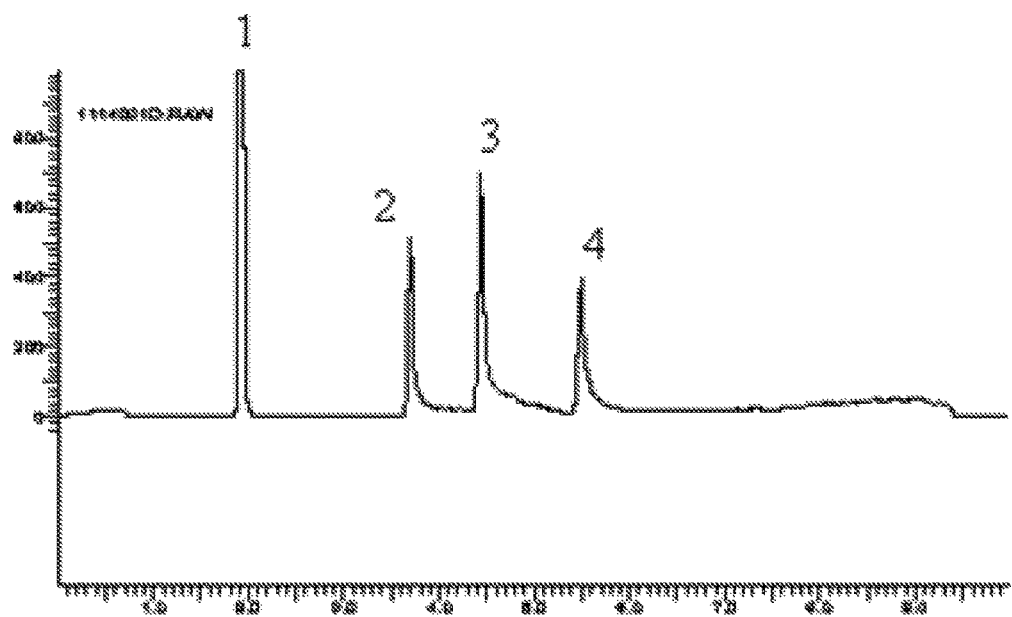
FIG. 3. Gas chromatography of initial fatty acid mixture in octane, 1-octane, 2-octanoic acid, 3-pelargonic acid, 4-capric (n-decanoic) acid).
Figure 4:
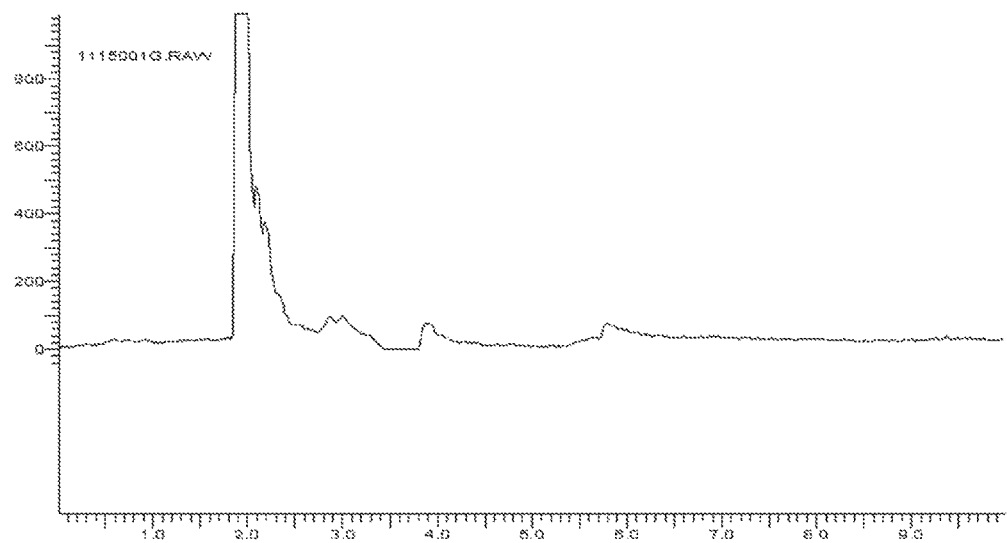
FIG. 4. Gas chromatography of the same solution after treatment in hollow fiber membrane module.

Industrial hollow fiber membrane modules have surface area in the range from 1 to 200 m$^2$, thus making the whole washing process much faster, which makes it possible to use membrane-based washing in practice. This is illustrated in FIG. 3 and FIG. 4. Gas chromatogram of the initial model solution in octane is presented in FIG. 3 in comparison to the results after treatment (FIG. 4). After treatment in a hollow fiber membrane module of a solution, which had a mixture of three fatty acids (0.56 M octanoic ($C_8$) acid, 0.39M pelargonic ($C_9$) acid, and 0.07M decanoic (n-capric) acid) their gas chromatography peaks practically disappeared.

Example 5

Figure 5:
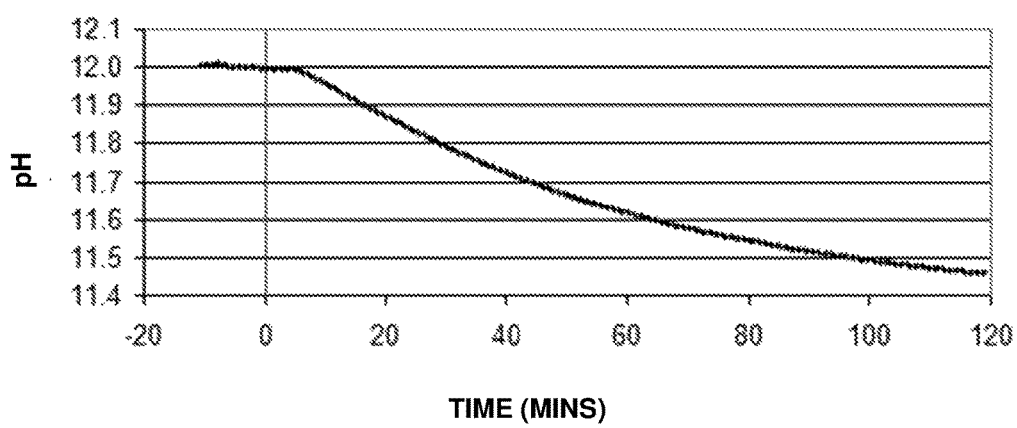
FIG. 5 Kinetics of pH change in alkaline aqueous solution due to transfer of mixture of fatty acids from octane through a hollow fiber membrane module.

FIG. 5 demonstrates kinetics of pH decrease in a washing phase when a mixture of these three acids in octane (volume 0.5 L) was treated by 1 L of alkaline solution of $K_2CO_3$, pH 12.0 in a hollow fiber membrane module with total area 1.4 m$^2$. After 2 hrs of washing the process practically stopped, and octane practically did not have dissolved fatty acids.

Example 6

Similar process can be used to remove fatty acid from glycerol esters (biodiesel). Water emulsified in oil and present in water alkaline metal ions, used as catalysts in biodiesel production, are removed simultaneously with fatty acids. Finally, water distribution is determined by its distribution coefficient, and for biodiesel/aqueous solutions water content is less than 0.05%.

DESCRIPTION OF THE PREFERRED EMBODIMENTS

Figure 6:
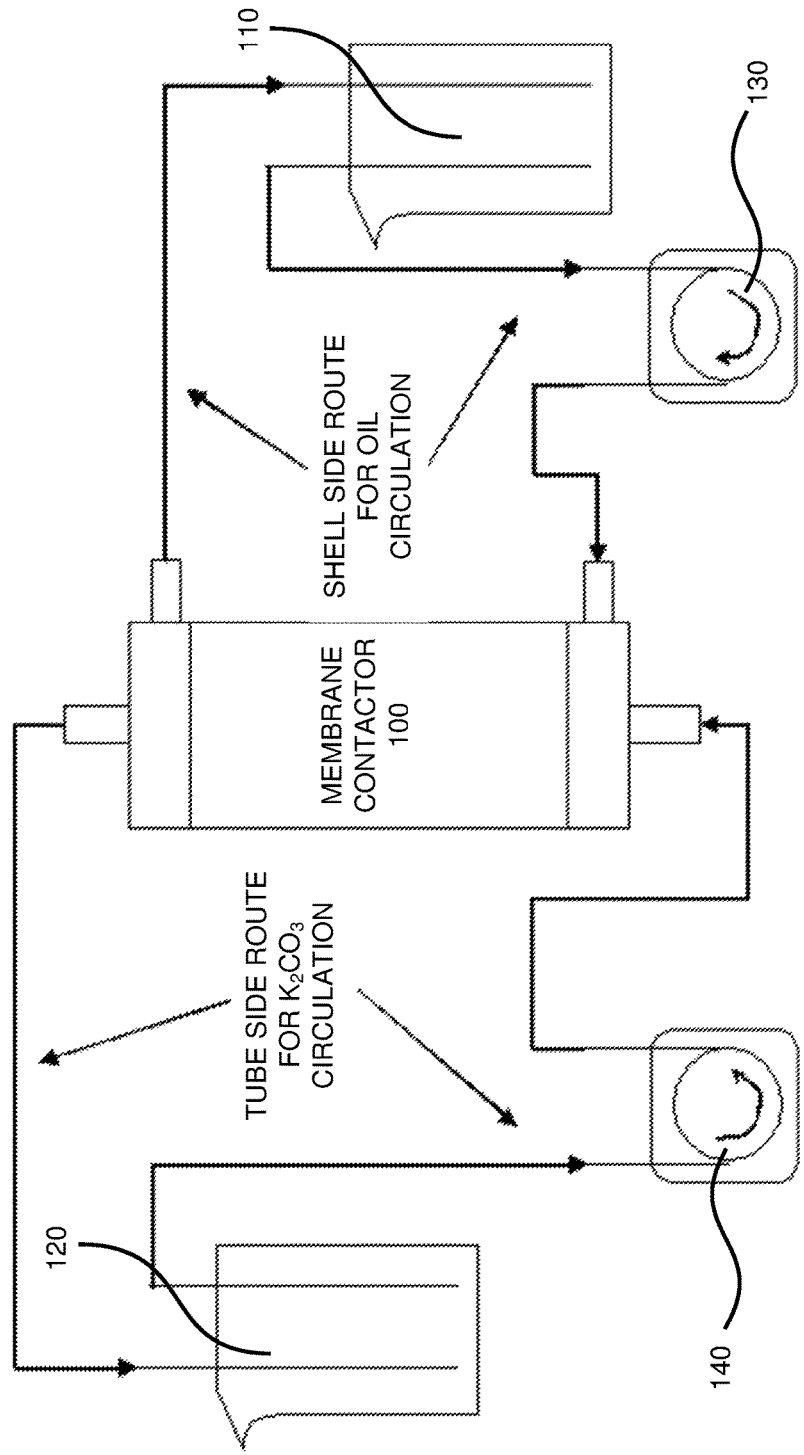
FIG. 6. Schematics of the plant for fatty acid removal.

FIG. 6 illustrates the preferred embodiment. The process is conducted in a hollow fiber membrane module 100 with large membrane area per module volume, which may be above several thousand m$^2$/m$^3$. Membranes may have porosity 20-60%, and membrane thickness 15-75 microns. The membrane module has two entry ports and two exit ports. The inlet and outlet of a shell side are connected with the vessel 110 with oil, and the inlet and outlet of a tube side are connected with the vessel 120 with washing aqueous solution.

Both solutions are pumped in recirculation mode with pumps 130 and 140. Flow rate depends on the size of membrane module, and it can be varied. For example, flow rate of aqueous phase in example 4 was 150 ml/min in tube side; and flow rate of oil (in shell side) was 30 ml/min.

If the membrane is hydrophobic, oil fills the pores. To prevent oil from penetrating into aqueous solution, and to have meniscus in the pore, the pressure in tube side should be higher than that in the shell side. This pressure difference often is less than 0.1 atm, and may be regulated by simple increasing the flow rate in a tube side. Temperature range 4-120° C. (39-248° F.). Oil viscosity at 25° C. is in the range 0.5-100 mPaxs. Pressure, pH of aqueous solution and flow rates may be additionally monitored. Module can be cleaned, regenerated and used again for several months or even years.

We disclose a rapid, simple, energy—efficient and low cost process to deacidify organic oils and lipid solutions without direct mixing of organic and alkaline phases. Simultaneously it is possible to remove water and different low molecular weight impurities, including catalysts used to synthesize biodiesel. Method is based on spontaneous extraction of fatty acids and other impurities from oils into alkali solution, separated from oil by a porous membrane. Instead of a flat membrane a membrane module with membrane-based hollow fibers is used. Oil flows outside the fibers and aqueous alkali solution—inside. They are not mixed, but fatty acids, water and other low molecular weight impurities are extracted through the oil/water interface formed in membrane pores.

The method is carried out at room temperatures, which provides many benefits. First, it provides significant energy savings in comparison to distillation at high temperatures. Second, low temperature and the ability to conduct separation under anaerobic conditions means that the lipids and vitamins are not oxidized and remain stable. The benefit is a far better quality product including a clearer color, which is important for food oils, including palm and coconut oils, vegetable oils, soya and sunflower oils, etc.

Free fatty acids in alkaline solutions are converted into salts. These salts may form solid phase, which depends on temperature, and pH. Solids may be separated by traditional methods and used as a raw material, for example, in soap production or returned and reused in the biodiesel synthesis.

Advantages of the New Technology:
1. ability to remove both fatty and naphthenic acids;
2. water is not added into oil but it is even removed from it;
3. no water-in-oil emulsion formation, i.e., no need for demulsification or high temperature (95° C.) treatment to destabilize the emulsion;
4. no centrifugation or mixer/settler is necessary;
5. low loses of neutral components, low hydrolysis and saponification of lipids;
6. ability to use alkaline solutions with ammonia, $Ca(OH)_2$, $Mg(OH)_2$;
7. less bleaching earth is necessary;
8. ability to use water/isopropanol mixtures as a strip phase;
9. ability to treat miscella in hexane or octane as a feed phase;
10. ability to improve biodiesel properties, i.e., to remove methanol, catalyst, soaps, water and glycerol (Standard ASTM D6751-02);
11. less metal corrosion (NACE Standard TM0172-2001);
12. process is continuous, easily scalable, energy efficient and environmentally friendly;
13. purified oil often is ready to be used and no additional processing steps are necessary.

What is claimed is:

1. A membrane-based oil washing process to remove an excess of emulsified water, metal ions, water-soluble colored and smelly impurities, and fatty acids, comprising:
   feeding a flow of an oil solution through a first side of a hollow fiber membrane module,
      wherein the oil solution comprises one or more types of impurities selected from the group consisting of: emulsified water, metal ions, water-soluble impurities, and fatty acids;
   feeding a flow of an aqueous solution through a second side of the hollow fiber membrane module;
   removing the impurities from the flow of the oil solution and into the flow of the aqueous solution through the hollow fiber membrane module; and
   separating, through one or more membranes of the hollow fiber membrane module, the flow of the oil solution and the flow of the aqueous solution.

2. The membrane-based oil washing process of claim 1, wherein the oil solution flows outside of one or more fibers of the hollow fiber membrane module and the aqueous solution flows inside the one or more fibers.

3. The membrane-based oil washing process of claim 1, wherein the oil solution and the aqueous solution are pumped in a recirculation mode from respective source vessels through the hollow fiber membrane module and then back to the respective source vessels.

4. The membrane-based oil washing process of claim 1, wherein both the oil solution and the aqueous solution flow in the same direction in a horizontal module, thus minimizing changes of transmembrane pressure difference in the hollow fiber membrane module.

5. The membrane-based oil washing process of claim 1, wherein the membrane is porous and is made of hydrophobic polymer material, so that the membrane pores of the one or more membranes are filled with oil.

6. The membrane of claim 5, wherein the effective pore size of the membrane pores is small enough such that hydrodynamic mixing of the oil solution and the aqueous solution does not take place.

7. The membrane-based oil washing process of claim 1, wherein additional stabilization of an oil/water meniscus in the membrane pores of the one or more membranes is achieved by applying a transmembrane pressure difference with a higher pressure in the aqueous solution.

8. The membrane-based oil washing process of claim 1, wherein the fatty acid impurities comprise a mixture of fatty acids comprising shorter fatty acids.

9. The membrane-based oil washing process of claim 8, wherein to fractionate the fatty acids, one or more modules with different pH of washing solution are used in series, starting with a more acidic washing solution.

10. The membrane-based oil washing process of claim 9, wherein aqueous solution has a pH less than 5 to selectively remove shorter fatty acids.

11. The membrane-based oil washing process of claim 9, wherein the aqueous solution has a pH of greater than 10 to remove all fatty acids.

\* \* \* \* \*